July 2, 1940.  V. A. REINHOLZ ET AL  2,206,512
REMOTE CONTROL FOR RADIO RECEIVING SETS
Filed April 11, 1938  3 Sheets-Sheet 1
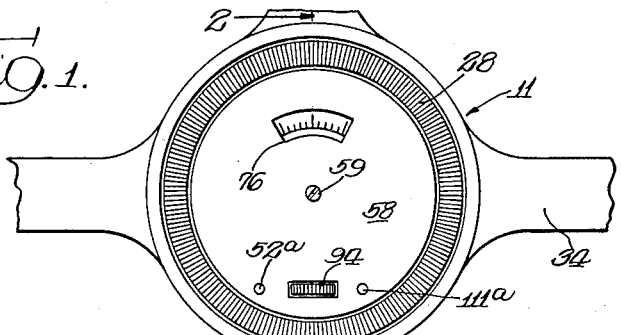
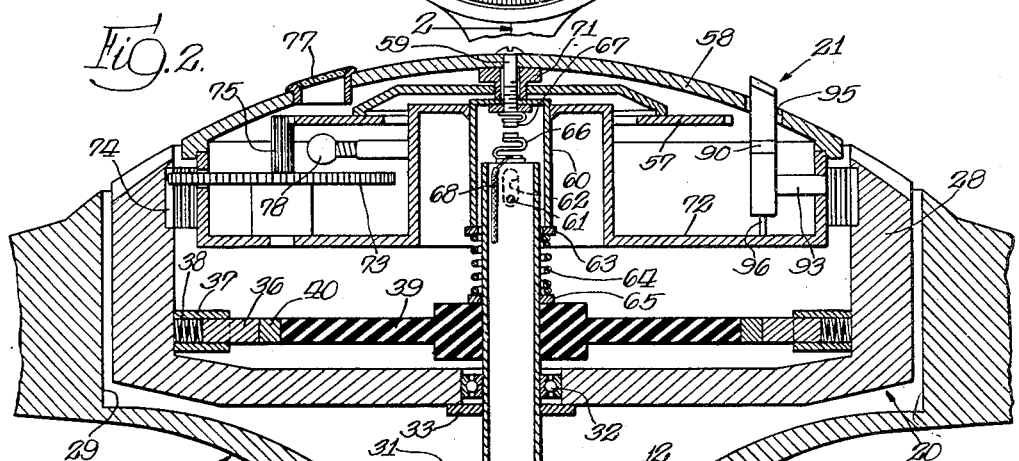
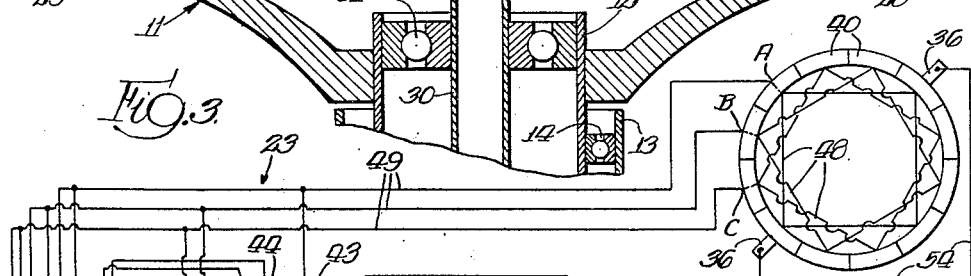
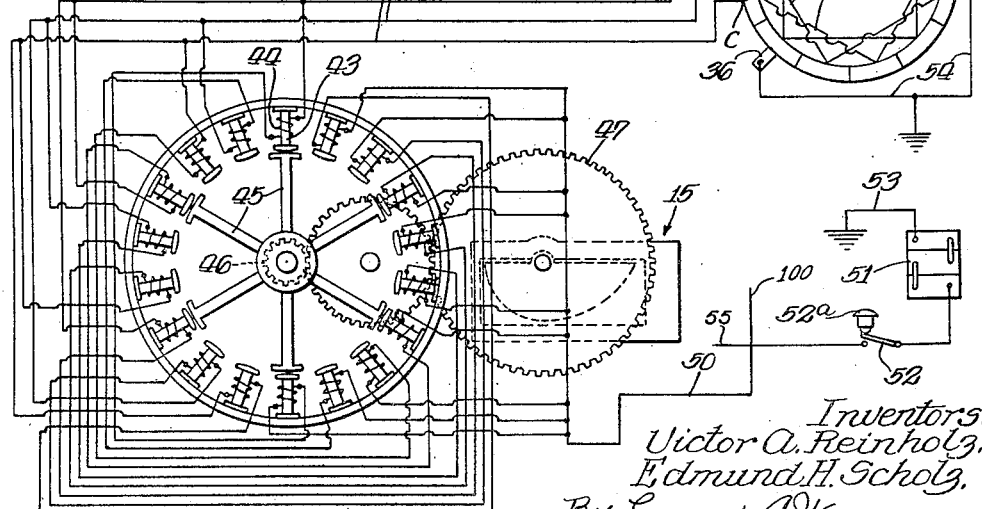
Inventors:
Victor A. Reinholz,
Edmund H. Scholz,
By Ernest A. Wegner Atty.

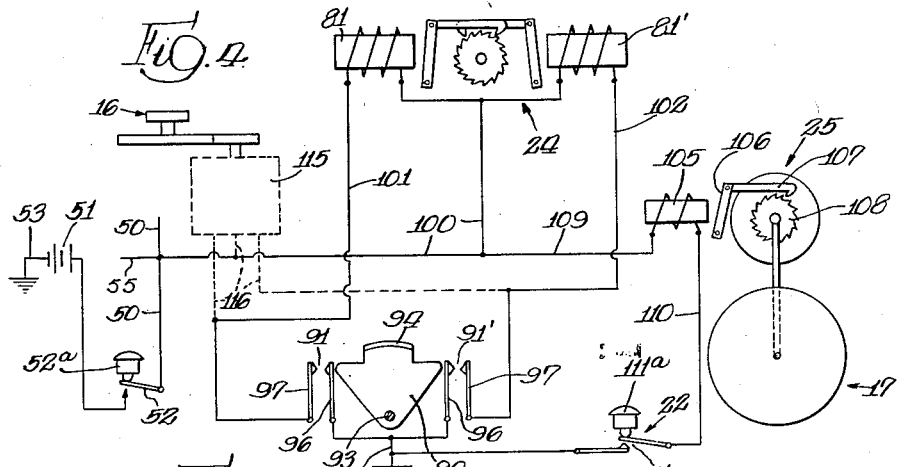
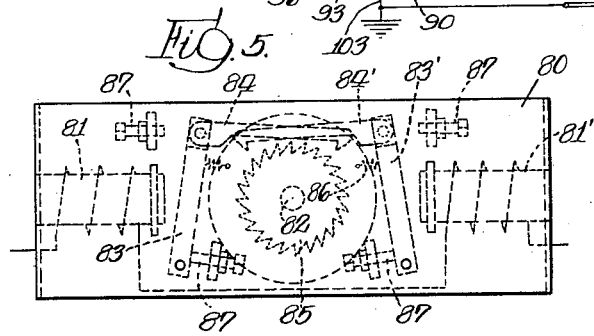
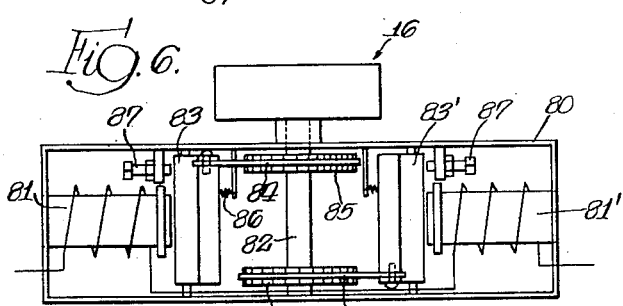
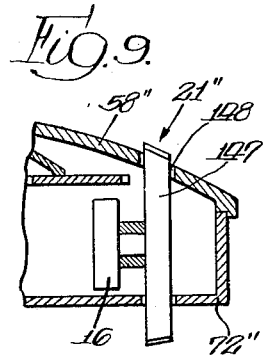
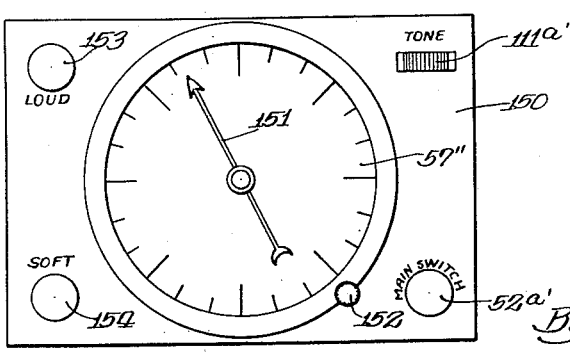

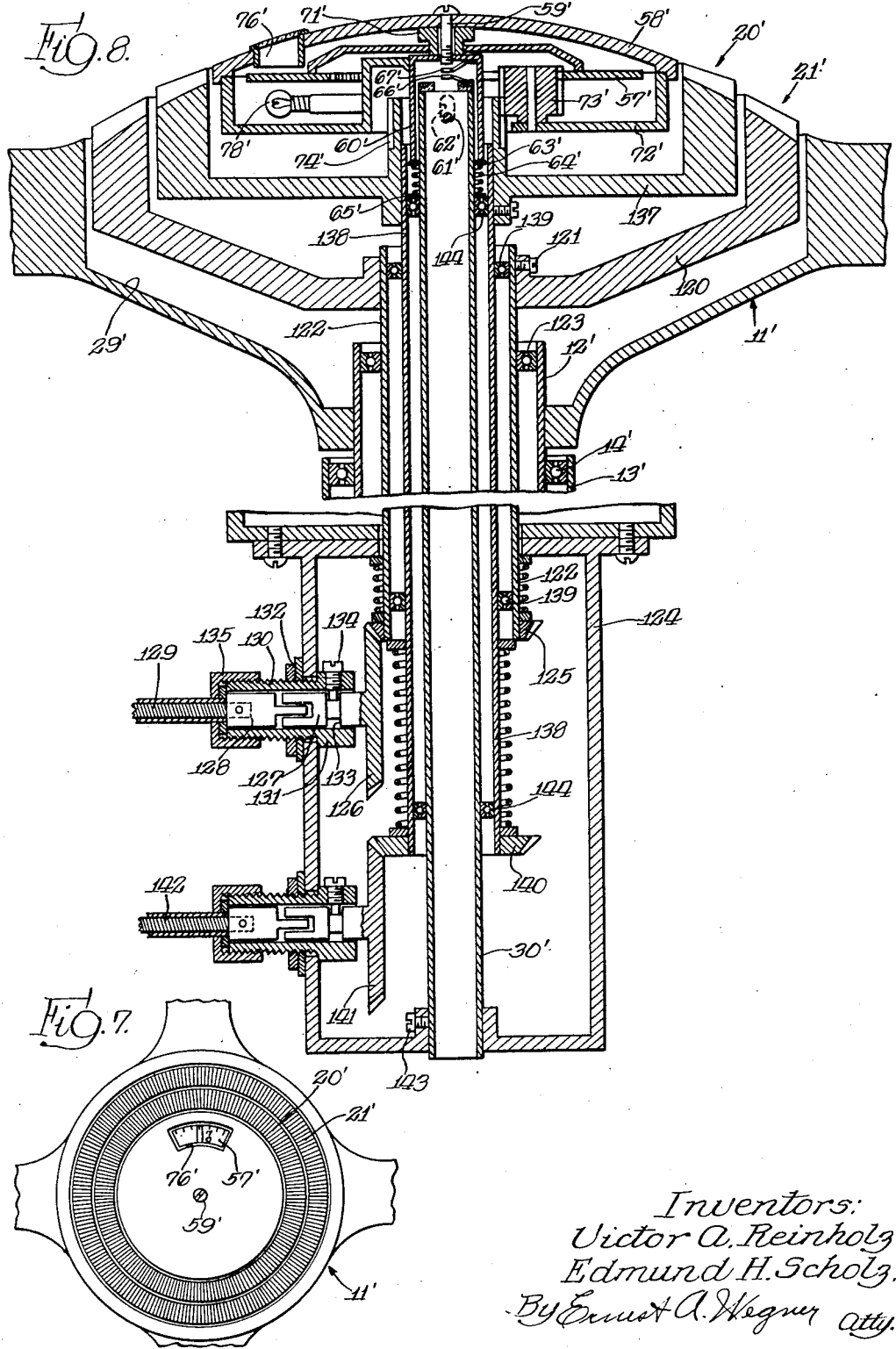

Patented July 2, 1940

2,206,512

UNITED STATES PATENT OFFICE 2,206,512

REMOTE CONTROL FOR RADIO RECEIVING SETS

Victor A. Reinholz, Reedsburg, Wis., and Edmund H. Scholz, Chicago, Ill.

Application April 11, 1938, Serial No. 201,304

10 Claims. (Cl. 250—20)

This invention relates to means for controlling a radio receiving set from a remote point and has as a general object to provide new and improved remote control means which is adaptable for use in a variety of environments.

More particularly, an object of the invention is to perfect a new and improved remote control means for a radio receiving set which is particularly adapted for use with a radio receiver in an automotive vehicle.

Another object is to perfect remote control means which may be mounted on the steering column of an automotive vehicle above the steering wheel where it may be manipulated by the operator of the vehicle without removing his hand from the steering wheel and where it is in the direct line of vision so as to be viewed by the operator without more than a momentary removal of his eyes from the road.

Another object is to provide remote control means for a radio receiving set, the primary control elements of which are adapted to be incorporated in a more or less conventional steering wheel of an automotive vehicle in a manner presenting a neat and attractive appearance.

Yet another object is to provide a new and improved remote control means for a radio receiving set which means is entirely electrical.

Still another object is to provide new and improved remote control means of the character described which is entirely mechanical.

A further object is to provide a new and improved means for controlling from a remote point the tuning, volume and also the tone of a radio receiving set whether in an automotive vehicle or the home.

Yet a further object is to provide new and improved electric motor means connected in simple circuits for the actuation of the tuning, volume and tone controls of a radio receiving set.

Other objects and advantages will become apparent from the following detailed description taken in connection with the accompanying drawings, in which:

Fig. 1 is a fragmentary plan view of a preferred form of the invention as embodied in the steering wheel of an automotive vehicle.

Fig. 2 is an enlarged diametrical sectional view taken approximately along the line 2—2 of Fig. 1.

Fig. 3 is a diagrammatic view of a portion of the electrical circuit of the remote control means.

Fig. 4 is a diagrammatic view of another portion of the electrical circuit of the remote control means.

Fig. 5 is a side elevational view of one of the motor means shown in Fig. 4.

Fig. 6 is a top plan view of the motor means of Fig. 5.

Fig. 7 is a fragmentary plan view of a modified form of the invention also embodied in the steering wheel of an automotive vehicle.

Fig. 8 is an enlarged diametrical sectional view of the control means of Fig. 7.

Fig. 9 is a fragmentary sectional view of another modification.

Fig. 10 is a plan view of still another modification of the invention adapted for use with a house radio.

While the invention is susceptible of various modifications and alternative constructions, it is shown in the drawings and will be described hereinafter in a preferred embodiment and several modifications, but it is not intended that the invention is to be limited thereby to the specific constructions disclosed, but it is intended to cover all modifications and alternative constructions falling within the spirit and scope of the invention as defined by the appended claims.

Generally speaking the invention contemplates the provision of means for controlling a radio receiving set from a remote point, which means is so constructed that it is readily adaptable for use in a variety of circumstances or environments. Conventionally a radio receiving set has tuning control means consisting of one or more condensers, volume control means consisting of a rheostat, and tone control means for modulating the pitch of the speech or music received over the set. The remote control means governing the setting of the tuning, volume and tone control means comprises generally manually actuable elements located remotely from the radio receiving set and means for transmitting the motion of the manually actuable elements to the various control means.

More particularly, however, the invention contemplates the perfection of remote control means for use with the radio of an automotive vehicle with the remote control means of such construction that the manually actuable elements thereof may be incorporated in the steering wheel of the automotive vehicle so as to be readily visible by the operator of the vehicle and so that they may be actuated by the operator without removing his hand from the steering wheel, or at least while retaining his hand in close proximity to the steering wheel. A preferred form of the invention adapted for use with the radio receiving set of an automotive vehicle is disclosed in Figs. 1 to 6 of the drawings.

Referring now more particularly to these Figs. 1 to 6, 11 (see Figs. 1 and 2) represents a more or less conventional steering wheel fixed on the upper end of a tubular shaft 12 projecting from the upper end of a steering column 13 in which it is rotatably supported in ball bearings 14. The tuning control means of a radio receiving set is represented in Fig. 3 by a single condenser, herein generally designated 15 (see Fig. 3), while the volume control means is represented by a rheostat, herein designated 16 (see Fig. 6), and the tone control means is represented by a more or less conventional construction herein represented as 17 (see Fig. 4). These control means per se constitute no part of the invention and thus are illustrated somewhat diagrammatically and will not be described in detail.

The remote control means in this form of the invention comprises generally a manually actuable element generally designated 20 (see Fig. 2) for governing the tuning control means, a manually actuable element generally designated 21 for governing the volume control means, and a manually actuable element 22 for governing the tone control means, all located centrally of the steering wheel 11 where they are readily visible to the operator of the vehicle without removing his eyes from the road for more than a moment and where they can be manipulated while still retaining his hand on the steering wheel, or at least in very close proximity thereto. In the present form of the invention, the movement of the manually actuable elements is transmitted to the various control means electrically and thus there are located at the radio receiving set a plurality of electric motors generally designated 23, 24 and 25 operatively associated respectively with the tuning, volume and tone control means to actuate the same and which are connected in electrical circuit with the manually operable elements so as to be responsive to the actuation thereof.

Considering first that portion of the remote control means governing the tuning control means, the manually operable element 20 herein takes the form of an annular ring 28 which is disposed within a recess 29 formed centrally of the steering wheel and opening through the upper face thereof. This ring 28 is rotatably supported within the recess 29 on a fixed tube 30 extending axially of the tubular shaft 12 and the steering column 13. Preferably ball bearings 31 are interposed between the tube 30 and the shaft 12. The annular ring 28 is metallic and preferably is journaled on the tube 30 by means of ball bearings 32 and also has a wiping contact with a metallic washer 33 fixed on the tube 30 in order to provide a ground connection through the frame of the vehicle for a purpose which will shortly become apparent. The upper edge of the annular ring 28 may be serrated so that it is readily rotated, for example, by the thumb of either hand of the operator of the vehicle while he continues to grasp a spoke 34 of the steering wheel.

Carried by the annular ring 28 are two diametrically oppositely disposed brushes 36, each mounted slidably in a socket 37 and urged outwardly by a compression spring 38. These brushes contact a commutator 39 of insulating material non-rotatably fixed upon the tube 30, which commutator carries upon its periphery a plurality of metallic commutator segments 40 (see Figs. 2 and 3). These commutator segments are adapted to be connected electrically to the motor 23 associated with the tuning control means 15 in a manner causing the motor to rotate in a direction and to an extent corresponding with the extent and direction of rotation of the annular ring 28.

In the present instance the motor 23 is of unique yet simple construction, particularly adapted for control by the manually actuable element of the type disclosed. To that end the motor 23 comprises a stator composed of a plurality of poles 43 each having a field winding 44 and a rotor composed of a plurality of pairs of individual armatures 45. The rotor has fixed for rotation therewith a gear 46 for driving the tuning control means 15 through a suitable train of gears 47. For best operation, the poles 43 should be so wound and connected in circuit as to form north and south poles alternately, and the relation of the number of poles to the number of pairs of armatures 45 should be such that opposite ends of each pair of armatures will be opposite a north and a south pole respectively. In the present instance the motor 23 has eighteen poles 43 and has three pairs of armatures 45, with the result that there is an end of an armature opposite each third pole. With this number of poles and armatures, each third segment 40 (see Fig. 3) of the commutator 39 is interconnected electrically by means of leads 48 to form three series A, B and C of four segments each, the commutator having a total of twelve segments. Each series is then connected by suitable leads 49 to one end of the winding 44 on each third one of the poles 43. The remaining ends of the windings 44 are connected by suitable leads to a common lead 50 connected to one terminal of a storage battery 51. Preferably there is interposed in the lead 50 a switch 52 manually actuable by means of a button 52a to make or break the circuit to the battery, and operable to remain in either an open or a closed position. To complete the circuit, the remaining terminal of the battery 51 is grounded on the frame of the vehicle in conventional manner by means of a lead 53, the brushes 36 as previously stated being grounded through the tube 30. This ground connection in Fig. 3 is represented by the leads 54. It is to be understood that the number of poles and armatures and the number of segments 40 on the commutator here shown is not a fixed number but this number may be varied depending upon the gear train 47 which is employed and depending upon the precision in tuning which is desired.

In order that the station selected by manipulation of the annular ring 28 may also be readily seen, provision is made for mounting a dial 57, indicating the stations or the wave length of the stations, on the steering wheel. To that end the steering wheel 11 is provided with a large, rounded horn button 58 which covers the space within the annular ring 28 and which conforms in contour to the upper edge of the ring 28 so as to provide a substantially continuous surface to effect a neat appearance. This horn button is secured by means of a bolt or rivet 59 to the closed upper end of a tubular sleeve 60 which is slidably received over the end of the tube 30 but retained against rotation relative thereto and against movement off of the end of the tube 30 by means of a pin 61, fixed diametrically in the tube 30 and extending through longitudinal slots 62 in the sleeve 60. The sleeve 60 at its lower end rests upon and is supported by an annular washer 63 resting upon one end of a compression spring 64 encircling the tube 30 and at its other end abutting a washer 65 resting on the hub of the commutator 39. The upper end of the tube 30 carries a spring contact 66 for cooperation with a contact 67 secured to the lower end of the bolt 59 to complete a circuit to the horn when the horn button 58 is depressed by compression of the spring 64. The lead 68 for the contact 66 extends, as shown in Fig. 2, within the tube 30 and similarly the leads 49 (not shown in Fig. 2) leading from the commutator segments may also extend within the tube 30.

Spacing the horn button 58 from the sleeve 60 is a collar 71 upon which is rotatably mounted the dial 57. Fixedly supported from the sleeve 60 is a carrier 72 providing a journal for a gear 73 which meshes with internal gear teeth 74 formed on the annular ring 28. Fixed to rotate with the gear 73 is a pinion 75 meshing with gear teeth formed on the periphery of the dial 57 in order that the dial may be rotated in accordance with the rotation of the annular ring 28. In order that the dial 57 may be visible, the horn button 58 is provided with a suitable arcuate aperture 76 which preferably is closed by a suitable transparent means 77. The dial 57 in conventional manner is made of a translucent material and a small electric bulb 78 is positioned beneath the aperture 76 so that the light therefrom will shine through and illuminate the dial 57.

Considering now the portion of the remote control means for governing the volume control means 16: This portion of the remote control means, as previously stated, comprises a motor 24 operatively associated with the rheostat 16 and a manually operable element generally designated 21. The motor 24 is reversible and in the preferred form is of the step-by-step type of motor. As best seen in Figs. 5 and 6, the motor is housed in an elongated casing 80 having at each end a solenoid 81 and 81', and intermediate the solenoids extending transversely of the casing 80 and rotatably journaled therein is a shaft 82 connected with the rheostat 16. Actuated by the solenoids 81 and 81', respectively, is an armature 83 and 83', each pivoted at its lower end in the casing 80 and each having pivotally connected to its upper end a pawl 84 and 84', respectively. The pawl 84 cooperates with a ratchet wheel 85 fixed on the shaft 82 while the pawl 84' cooperates with a ratchet wheel 85' also fixed on the shaft 82. The teeth on the ratchet wheels 85 and 85' are reversed in order that each pawl may engage with the teeth of the respective ratchet wheel when the armature is attracted by the solenoid, and so that the pawls will pass over the teeth without rotating the respective ratchet wheel when the solenoids are deenergized and the armatures retracted by tension springs 86. The extent of rotation of the shaft 82, as a result of each energization of one of the solenoids may be varied by adjusting the extent of movement of the armatures by means of adjustable limit screws 87 provided for that purpose and the precision of movement may be determined by the number of ratchet teeth provided. It will be seen from the foregoing that by successive energization of either the solenoid 81 or the solenoid 81' the shaft 82 may be rotated in one direction or another to increase or decrease the volume of sound of the radio receiving set.

In the present form of the invention the manually actuable element 21 comprises a switch button 90 and a pair of switches 91 and 91' controllable by the switch button 90. Herein the switch button 90 takes the form of a generally triangular plate pivotally mounted at its apex on a pin 93 fixed in the carrier 72, and a knurled projection 94 extending upwardly through an aperture 95 provided for that purpose in the horn button 58 adjacent the periphery thereof so that the switch button 90 may be actuated by a digit of the hand of the operator of the vehicle while on or in close proximity to the steering wheel. The switches 91 and 91' are each composed of an upstanding spring contact 96 and a cooperating contact 97 supported by the carrier 72 on opposite sides of the switch button 90 so as to be selectively actuable by pivotal movement of the switch button to one side or the other.

As best seen in Fig. 4, the manually actuable element 21 and the motor 24 are connected in an electrical circuit forming a branch of the electrical circuit of the remote control means. To that end a lead 100 is connected at one end to the common lead 50 and at its other end is connected by branch leads to one end of each the solenoid 81 and 81'. The remaining end of the solenoid 81 is connected by a lead 101 to the contact 97 of the switch 91, while the remaining end of the solenoid 81' is connected by a lead 102 to the contact 97 of the switch 91'. The contacts 96 are connected to ground by means of leads 103 to complete the circuit. It will be seen from the foregoing that the solenoids 81 and 81' are connected in parallel, with the switches 91 and 91', respectively, in series connection therewith so that closure of the switch 91 will energize the solenoid 81 while closure of the switch 91' will energize the solenoid 81'.

Considering now the portion of the remote control means governing the tone control means 17, the motor 25 which drives the ton control means 17 as employed herein is the equivalent of half of the motor 24. Accordingly, the motor comprises a solenoid 105, a pivotally mounted armature 106, a pawl 107 actuated by the armature, and a ratchet wheel 108 with which the pawl 107 cooperates to impart step-by-step rotation to a shaft operatively connected with the tone control means 17. The solenoid 105 of the motor 25 is connected in parallel with the solenoids 81 and 81' by means of a lead 109 connected to the lead 100 and a lead 110 connected to ground the same as the leads 103. Interposed in the lead 110 to control the energization of the solenoid 105 is normally open switch 111 having a switch button 111a for actuating the switch and together forming the manually actuable element generally designated 22. The switches 52 and 111 are also mounted on the carrier 72 adjacent the switches 91 and 91' and the horn button 58 is provided with apertures adjacent its periphery and on opposite sides of the aperture 95 through which the switch buttons 52a and 111a project for actuation by the operator of the vehicle. While not shown in Fig. 2, it is to be remembered that the tube 30 provides a convenient duct for the passage of the leads for the switches 91 and 91' and the switches 52 and 111.

In order that the switch 52 may also control the receiving set proper, the lead 55 from the set is connected to the lead 50 beyond the switch 52. The switch button 52a is also adapted to actuate some conventional means (not shown) for locking the ring 28 against rotation when the switch 52 is open so as to prevent rotation of the ring without a corresponding rotation of the motor 23.

It is to be noted, particularly from a consideration of Fig. 1, that the manually actuable elements and the dial are so constructed that they may readily be incorporated in a more or less conventional and standard steering wheel and at the same time present an extremely neat appearance. Moreover, because they may be incorporated in the steering wheel, they are so located that they are readily visible and are in the direct line of vision of the operator of the vehicle so that he need glance down but momentarily to observe the dial and the actuable elements. Furthermore, the manually actuable elements are so located that they are readily found by the operator without the necessity of glancing at the elements and may be actuated while the hand remains on the wheel, or at least in such close proximity thereto that it may readily grasp the wheel in case of emergency. Thus the element 20 is readily rotated by the thumb of either hand of the operator of the vehicle, while the hand rests on one of the horizontal spokes 34. Similarly the switch buttons 94, 52a and 111a may be actuated by the thumb of an operator of the vehicle while his hand remains on the lower or downwardly extending spoke 34.

In a modification of the above described form of the invention, the step-by-step motor 24 driving the volume control means 16 may be replaced by a reversible electric motor 115 (see Fig. 4) of the continuously rotating type. The motor 115 is connected in circuit in the same manner as the motor 24, as indicated by the broken line leads 116. When the motor 115 is employed, the adjustment of the volume of sound of the radio is somewhat simplified in that the switch button 90 may be actuated and retained in actuated position until the desired volume of sound is obtained, whereas in the preferred construction the switch button 90 must be successively actuated for continued movement of the volume control means.

In the embodiment shown in Figs. 7 and 8 of the drawings, the invention takes the form of a wholly mechanical remote control means. In this form of the invention the remote control means is still adapted for use with the radio in an automotive vehicle, and thus is still constructed to be incorporated in a steering wheel 11' of an automotive vehicle. The wheel 11' is rigidly secured to the projecting upper end of a shaft 12' extending longitudinally of a conventional steering column 13' in which it is rotatably journaled, preferably in ball bearings 14'. The remote control means still comprises a manually actuable element generally designated 20' governing the tuning control means and a second manually actuable element generally designated 21' for governing the volume control means. These manually actuable elements are, however, connected mechanically with the control means and not electrically, as in the preferred form of the invention. To that end the element 21', taking the form of an annular ring 120, is rotatably mounted in the recess 29' formed in the upper surface of the steering wheel and is fixedly secured as by a screw 121 to a tube 122 extending longitudinally of the shaft 12' and projecting at the upper end therefrom for the reception of the ring 120. The tube 122 is rotatably mounted within the shaft 12' and is preferably journaled in ball bearings 123. At its lower end the tube 122 projects into a housing 124 depending from the lower end of the steering column. Mounted non-rotatably on the lower end of the tube 122 is a bevel gear 125 which meshes with a bevel gear 126 fixed on one element 127 of a coupling, a cooperating element 128 of which is secured to a flexible shaft 129 adapted to be connected to the volume control means of a radio receiving set. The coupling preferably is housed in an external threaded sleeve 130 extending through an aperture in the housing 124 and rigidly secured by clamping the wall of the housing 124 between a head 131 on the sleeve and lock nuts 132 threaded onto the sleeve. To prevent withdrawal of the element 127 from the sleeve, it is formed with an annular groove 133 into which projects one end of a screw 134. The element 128 of the coupling is retained in engagement with the element 127 by means of a screw cap 135.

In this form, the element 20' also takes the form of an annular ring 137 rotatably disposed within the ring 120 and non-rotatably fixed upon a tube 138 extending longitudinally within the tube 122. This tube also is rotatably mounted and is preferably journaled in ball bearings 139 with its upper end projecting from the upper end of the tube 122 with its lower end projecting from the tube 122 and into the housing 124. At its lower end the tube 138 carries a bevel gear 140 meshing with a bevel gear 141 in turn connected to a flexible shaft or cable 142 through the medium of a coupling identical with that connecting the bevel gear 126 to the shaft or cable 129.

Extending longitudinally within the tube 138 is a tube 30' which projects at its upper end from the tube 138 and at its lower end is fixed in the housing 124 as by means of a screw 143. Preferably ball bearings 144 are interposed between the tube 30' and the tube 138. The upper end of the tube 30' supports the horn button 58' which is secured by means of a screw 59' to the closed end of a sleeve 60' received slidably over the upper end of the tube 30'. The sleeve 60' is guided for longitudinal movement but is restrained against relative rotational movement with respect to the tube 30' by means of a pin 61' extending diametrically of the tube and the sleeve through elongated apertures 62' formed in the sleeve, and the sleeve 60' rests upon an annular washer 63' yieldably supported by means of a compression spring 64' engaging a second annular washer 65' resting upon the races of the ball bearings 144. On the upper end of the tube 30' is a spring contact 66' and carried by the closed end of the sleeve 60' is a cooperating contact 67' forming the switch of the horn circuit and controlled by the horn button 58'.

The horn button 58' is spaced from the sleeve 60' by means of a collar 71' and on this collar is rotatably journaled a dial 57' disposed beneath the horn button 58' so as to be visible through an arcuate aperture 76' formed in the horn button for that purpose. The inner periphery of the dial 57' has gear teeth formed thereon which mesh with a gear 73' rotatably journaled in a carrier 72' supported from the sleeve 60' and engaging the horn button 58' at its periphery to form an integral part thereof. The gear 73' also meshes with gear teeth 74' formed on an upstanding hub portion of the annular ring 137 in order that the rotation of the annular ring 137 may impart a corresponding rotation to the dial 57'. In conventional manner the dial 57' may be made of translucent material and a light bulb 78' disposed beneath it so as to illuminate it and make the figures thereon readable through the aperture 76' in the horn button 58'.

In Fig. 9 there is disclosed a modified form of control for the volume of the radio receiving set which may be employed to replace the annular ring 120 of the remote control means as disclosed in Figs. 7 and 8. In this form the volume control means 16 is mounted directly in the steering wheel and is then connected by leads with the proper elements of the radio receiving set. Accordingly, the volume control means 16 is supported in the carrier 72'' and directly connected with the control means is the manually actuable element 21'' which element here takes the simple form of a knurled wheel 147 adapted to project through an aperture 148 formed in the horn button 58'' near the periphery thereof for that purpose.

Fig. 10 discloses the control means of Figs. 1 to 6 adapted for use with a house radio receiving set. To that end the manually actuable elements are incorporated in a box-like housing 150. Mounted centrally on the top of the housing is a dial 57'' with which cooperates a rotatable pointer 151. Relative rotation between the brushes 36 and the commutator 39 is here obtained by rotation of a knurled stem 152 which is operatively connected to effect such relative rotation and which is also operatively connected with the pointer 151 to effect a corresponding rotation. The main switch button is represented at 52a' and the switch button for the switch 111 governing the tone control means is represented at 111a'. The switches 91 and 91' instead of being actuated by a single switch button 94, as shown in Figs. 2 and 4, have individual switch buttons 153 and 154 for actuating the same.

It is believed apparent from the foregoing that we have perfected a new and improved remote control means which is readily adapted for the control of a radio receiving set under various environments, such as in the home or in an automotive vehicle. The remote control means is neat, capable of a compact arrangement and is accurate and precise in its operation, yet is of comparatively simple construction so that it may be inexpensively and economically manufactured. While suitable for use in various environments, it is particularly adapted for use in an automotive vehicle and to that end is so constructed as to be capable of incorporation in a more or less standard steering wheel of such an automotive vehicle. Because it is capable of such incorporation in a steering wheel, it is located where it is in the direct line of vision of the operator of the vehicle and where it may be actuated while the hand of the operator of the vehicle remains on or in close proximity to the steering wheel. As a result the driving hazards of radio in an automotive vehicle are greatly reduced since our construction obviates the necessity of the operator of the vehicle removing his eyes from the road, and obviates the reaching and shifting out of normal driving position which is necessitated by the present location of the controls for the radio receiving set.

We claim as our invention:

1. Means for controlling from a remote point a radio receiving set, having a volume and a tuning control means, mounted in an automotive vehicle having a steering column, a steering wheel mounted on the upper end of the column and having a central recess opening through its upper face, and a stationary member projecting from the upper end of the steering column into the recess in the steering wheel comprising, in combination, an annular ring mounted concentrically and rotatably within the recess in the steering wheel and extending to the upper surface of the wheel to be readily actuated by a digit of the hand of the operator of the vehicle, means associating said annular ring in controlling relationship with the tuning control means to govern the station selection by the radio receiving set, an actuable element also disposed within the recess in the steering wheel and extending to the top surface thereof to be readily actuated by a digit of the hand of the operator of the vehicle, means associating said actuable element with the volume control means of the radio receiving set, a horn button disposed centrally of the recess in the steering wheel mounted on the stationary member for longitudinal movement relative thereto but restained against relative rotational movement, said horn button including a carrier disposed beneath the horn button, a dial indicating the station selected rotatable mounted with respect to said horn button beneath the same, said horn button having an aperture through which a portion of the dial is visible, and means journaled in said carrier and engaging said dial and said annular ring for imparting movement to said dial in accordance with the rotation of said annular ring.

2. In an automotive vehicle having a steering column, a steering wheel with a recess formed centrally thereof and opening through the upper face of the wheel, a tube extending longitudinally and fixedly of the steering column and projecting into the recess in the wheel, and a radio receiving set with a volume and a tuning control means, means for controlling the radio receiving set from a remote point comprising a first electric motor associated with the tuning control means, a second electric motor associated with the volume control means, means for governing said first electric motor to effect adjustment of the tuning control means comprising an annular ring rotatably mounted within the recess in the steering wheel and projecting from the recess to be actuable by the operator of the vehicle, a brush carried by said annular ring, and a commutator fixedly mounted on the tube and having a plurality of segments on its periphery adapted to be engaged by the brush as the annular ring is rotated, said commutator segments, brush and first electric motor being connected in electrical circuit to effect rotation of said motor in a direction and to an extent corresponding to the direction and extent of rotation of said annular ring, a horn button non-rotatably mounted on the tube disposed within said annular ring to complete the closure of the recess, and means for governing said second electric motor to effect adjustment of the volume control means comprising a pair of switches electrically connected in circuit with said second motor to govern the extent and direction of rotation of the motor, said switches being within the recess to be concealed by the horn button, and a switch button mounted within the recess in the steering wheel and projecting through the horn button for operation by the operator of the vehicle, said switch button being designed selectively to actuate said switches.

3. In an automotive vehicle having a steering column, a steering wheel with a centrally located recess opening through the upper surface of the wheel, a tube extending longitudinally and fixedly of the steering column and projecting into the recess in the wheel, and a radio receiving set with a tuning, a volume and a tone control means, electrical means for controlling the receiving set from a remote point comprising a first electric motor operatively associated with the tuning control means, a second electric motor operatively associated with the volume control means, a third electric motor operatively associated with the tone control means, means located remote from the receiving set for governing said first motor to effect adjustment of the tuning control means comprising an annular ring rotatably mounted on the tube within the recess in the steering wheel, a commutator fixed on the tube having a plurality of commutator segments on its periphery and a plurality of brushes carried by said annular ring adapted successively to engage the commutator segments as the ring is rotated, said commutator segments, brushes and first electric motor being connected in electric circuit to effect rotation of the motor in a direction and to an extent corresponding to the direction and extent of rotation of said annular ring, a horn button including a carrier disposed beneath the horn button non-rotatably supported from the tube within the annular ring to complete the closure of the recess in the steering wheel, means for governing said second electric motor from a remote point comprising a pair of switches electrically associated with said second motor to govern the direction of rotation thereof, said switches being mounted on said carrier, a first switch button also mounted on said carrier and operable selectively to actuate said switches, said switch button projecting through the horn button adjacent the periphery thereof to permit actuation by the operator of the vehicle, means remote from the receiving set for governing said third electric motor to effect adjustment of the tone control means comprising a switch supported by said carrier and electrically connected to said third motor and a second switch button projecting through the horn button near the periphery thereof to one side and adjacent to said first mentioned switch button, and a master switch means comprising a switch connected in circuit with said motors and said control means to be common to all, and a third switch button projecting through the horn button adjacent said first mentioned switch button and to the side thereof opposite said second switch button.

4. In an automotive vehicle having a steering column, a steering wheel with a recess in the upper surface thereof and a radio receiving set having tuning control means and volume control means, means for controlling the set from a remote point comprising a first annular ring rotatably disposed within the recess in the steering wheel, a mechanical connection between said ring and one of the control means of the radio receiving set, said connection in part extending longitudinally within the steering column, a second annular ring rotatably disposed within said first ring, a mechanical connection between said second ring and the other of the control means of the radio receiving set, said last mentioned connection in part extending longitudinally within the steering column, a horn button disposed within said second annular ring to complete the closure of the recess in the steering wheel, said horn button having an aperture therein, and a dial rotatably disposed beneath the horn button to be visible through the aperture in the horn button and driven by the annular ring governing the tuning of the radio receiving set so as to indicate the station selected.

5. In an automotive vehicle having a radio receiving set, a steering column and a steering wheel mounted at the top of the column and having a central recess opening through the upper face thereof, means for controlling the radio from a remote point and while the hand of the operator of the vehicle remains adjacent the steering wheel comprising a first tube extending longitudinally of the steering column with one end projecting from the upper end of the column into the recess in the steering wheel and rotatably mounted therein, a first annular ring rotatably disposed within the recess in the wheel and fixed on the projecting end of said tube, a cable operatively associated at one end with the lower end of said tube and operatively associated at the other end with the radio receiving set to effect control of the volume, a second tube disposed rotatably within said first tube and projecting at the upper end therefrom, a second annular ring rotatably disposed within said first ring and fixedly connected on the projecting end of said second tube, a cable operatively associated at one end with the lower end of said second tube and operatively associated at the other end with the radio receiving set to effect control of the tuning, a third tube extending within said second tube and projecting at the upper end therefrom, said third tube being fixed against rotation, a horn button yieldably mounted on said third tube to permit longitudinal movement of the button for the completion of a circuit to the horn of the vehicle, said horn button being disposed within said second annular ring to complete the closure of the recess in the steering wheel and having an aperture opening therethrough, a dial rotatably mounted beneath said horn button, and gearing interconnecting said second annular ring and said dial for rotating the dial in a direction and to an extent corresponding with the rotation of said second annular ring.

6. Remote control means for a radio receiving set for use in an automotive vehicle having a steering wheel with a central recess opening through the upper face thereof comprising a first electric motor associated with the radio receiving set to govern the tuning of the set, said motor having a plurality of poles and a plurality of armatures, a second electric motor associated with the radio receiving set to govern the sound volume of the set, a first manually actuable element comprising an annular ring rotatably mounted in the recess in the steering wheel and lying closely adjacent the periphery of the recess to be readily actuable by a digit of a hand of the operator of the vehicle while the hand continues to grasp a spoke of the steering wheel, a stationary commutator positioned in the recess in the steering wheel wtihin said annular ring having a plurality of segments connected in circuit with certain of the poles of said first mentioned electric motor, and brushes carried by said annular ring contacting the segments of said commutator and also connected in circuit to control the successive energization of the poles of said first electric motor in a sequence corresponding to the relative movement between the segments and the brushes carried by said annular ring, a plurality of switches connected in circuit with said second mentioned motor and selectively operable to determine the direction and extent of operation of said second motor, and switch buttons for actuating said switches projecting upwardly above said annular ring and closely adjacent the inner periphery thereof to facilitate actuation of the switch buttons while the hand of the operator remains on the steering wheel.

7. Remote control means for a radio receiving set in an automotive vehicle having a steering wheel provided with a central hub having an upwardly opening recess bordered by a rim above the spokes of the steering wheel, comprising an annular member rotatably supported within said recess with its outer periphery adjacent said rim and having a top surface free of projections and substantially flush with the top of the rim to provide a substantially continuous surface for free and unimpeded access of a digit of the hand of the operator of the vehicle for turning said member while the operator's hand remains grasping a spoke of the wheel, and a second annular member within said first mentioned annular member with its periphery adjacent to the inner periphery of said second member and having a top surface substantially flush with the top surface of said first member to provide a substantially continuous surface therewith, and means operatively associating said members with the radio receiving set for control thereof.

8. Remote control means for a radio receiving set in an automotive vehicle having a steering wheel provided with a central hub having an upwardly opening recess bordered by a rim above the spokes of the steering wheel, comprising an annular member rotatably supported within said recess with its outer periphery adjacent said rim and having a top surface free of projections and substantially flush with the top of the rim to provide a substantially continuous surface for free and unimpeded access of a digit of the hand of the operator of the vehicle for turning said member while the operator's hand remains grasping a spoke of the wheel, a circular element within said annular member forming a closure for the space within said annular member having an aperture therein, said element having a comparatively smooth top surface free from projections and disposed with its periphery adjacent the inner periphery of said member and substantially flush therewith to provide a substantially continuous surface closing the recess in the steering wheel, switch means mounted within said annular member and beneath said circular element, means extending through said circular element closely adjacent the periphery thereof to be actuable by a digit of a hand of the operator of the vehicle while the same remains on the wheel, said means controlling said switch means, a dial rotatably disposed within said annular member and beneath said circular element to be visible in part through the aperture in said circular element and driven in timed relation with said annular member to indicate the station selected, and means operatively associating said annular member and said switch means with the radio receiving set for control thereof.

9. Remote control means for a radio receiving set for use in an automotive vehicle having a steering wheel with a central recess opening through the upper face thereof comprising a first electric motor associated with the radio receiving set to govern the tuning of the set, a second electric motor associated with the radio receiving set to govern the sound volume of the set, a first manually actuable element comprising an annular member rotatably mounted in the recess in the steering wheel and having a top surface lying closely adjacent the periphery of the recess to be readily actuable by a digit of a hand of the operator of the vehicle while the hand continues to grasp a spoke of the steering wheel and being free of projections extending above the top surface or outwardly beyond the recess in the steering wheel, means positioned within the recess in the steering wheel within said annular member connected in circuit with said first mentioned electric motor and operable to cause said first electric motor to rotate in a direction and to an extent corresponding to the rotation of said annular member, a plurality of switches disposed within said annular member connected in circuit with said second mentioned motor and selectively operable to determine the direction and extent of operation of said second motor, and a second manually actuable element for actuating said switches disposed within said annular member and projecting slightly upwardly above said annular member closely adjacent the inner periphery of the top surface thereof to facilitate actuation while the hand of the operator remains on the steering wheel.

10. In an automotive vehicle having a steering column, a steering wheel with a recess in the upper surface thereof, and a radio receiving set having tuning control means and volume control means, means for controlling the set from a remote point comprising a first manually actuable element disposed within the recess in the steering wheel, said element terminating substantially flush with the top surface of the steering wheel and being free of projections extending beyond the periphery of the recess, a connection between said element and one of the control means of the radio receiving set, said connection in part extending within the steering column, a second manually actuable element also disposed within the recess in the wheel, said element terminating substantially flush with the top surface of the steering wheel and being free of projections extending beyond the periphery of the recess, a connection between said second element and the other of the control means of the radio receiving set, said last mentioned connection in part extending within the steering column, a closure member disposed within said recess to effect the closure of the recess in the steering wheel, said closure member being suitably formed for the projection thereabove of said elements to make the same readily actuable by a digit of a hand of the operator of the vehicle while affording protection against injury and accidental actuation, and means readily visible from above the steering wheel to indicate the station selected.

EDMUND H. SCHOLZ.
VICTOR A. REINHOLZ.